UNITED STATES PATENT OFFICE.

FRIEDRICH RÜNKEL, OF ELBERFELD, GERMANY, ASSIGNOR TO THE FARBENFABRIKEN, VORMALS FR. BAYER & CO., OF SAME PLACE.

BLUE AZO DYE.

SPECIFICATION forming part of Letters Patent No. 567,615, dated September 15, 1896.

Application filed February 26, 1896. Serial No. 580,860. (Specimens.) Patented in England April 7, 1891, No. 5,984; in France April 9, 1891, No. 212,648; in Italy April 27, 1891, XXV, 29,631, LVIII, 100; in Germany August 25, 1891, No. 77,169, and in Austria-Hungary December 6, 1891, No. 34,653 and No. 56,540.

*To all whom it may concern:*

Be it known that I, FRIEDRICH RÜNKEL, doctor of philosophy, a subject of the Emperor of Germany, residing at Elberfeld, Prussia, Germany, (assignor to the FARBENFABRIKEN, VORMALS FR. BAYER & CO., of the same place,) have invented a new and useful Improvement in the Manufacture of Blue Azo Dyestuff, (for which the aforesaid FARBENFABRIKEN have already obtained Letters Patent in Germany, No. 77,169, dated August 25, 1891; in England, No. 5,984, dated April 7, 1891; in France, No. 212,648, dated April 9, 1891; in Italy, XXV, 29,631, LVIII, 100, dated April 27, 1891, and in Austria-Hungary, No. 34,653 and No. 56,540, dated December 6, 1891;) and I do hereby declare the following to be an exact and clear description of my invention.

My invention relates to the production of a new blue coloring-matter by the action of one molecular proportion of diazotised dimethyl-paraphenylenediamin, $NH_2.C_6H_4.N(CH_3)_2$, upon one molecular proportion of the dihydroxynaphthalene sulfo-acid, S. (See Letters Patent No. 444,679, dated January 13, 1891.)

For carrying out my invention practically I proceed as follows: 13.6 parts, by weight, of paramidodimethylanilin (dimethyl-paraphenylenediamin) are dissolved in eighty-seven parts, by weight, of diluted hydrochloric acid, (containing ten per cent. of pure hydrochloric acid,) and while the resulting solution is well cooled down by means of ice seven parts, by weight, of sodium nitrite dissolved in water are added. The resulting liquid containing the formed diazo compound is allowed to flow into a cold solution prepared from dissolving twenty-seven parts, by weight, of the dihydroxynaphthalene monosulfonate of sodium and thirty parts, by weight, of sodium acetate in five hundred parts, by weight, of water. The formation of the dyestuff proceeds gradually and is facilitated by well stirring the mixture. However, a rather long period of time, say about six to eight days, is most practically necessary to render the production of the dyestuff complete. When this stage is arrived at, the most part of the dyestuff has separated as a blue precipitate, which is filtered off, washed with cold water, pressed, and dried. The constitution of the thus-produced coloring-matter corresponds with the following formula:

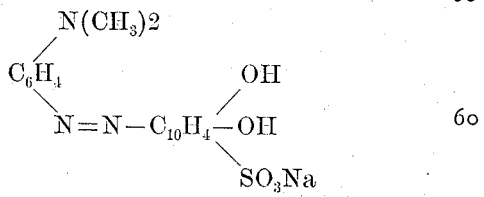

My new dyestuff forms in dry state a dark powder with bronze-like luster. It is almost insoluble in cold water, more easily soluble in hot water with a blue color, easily soluble in cold and hot alcohol with a blue color. In mixing its blue hot solution in water with ammonia liquor, sodium carbonate solution, diluted soda-lye, or with mineral acids the previous blue color is turned into red. By concentrated sulfuric acid (66° Baumé) the dye is dissolved with a violet color, which is changed into red on the addition of a large quantity of ice-water to the sulfuric-acid solution. The new product dyes wool in acid-baths a beautiful blue.

Having thus described my invention, and in what manner the same may be performed, what I claim as new, and desire to secure by Letters Patent, is—

1. The process of making a new coloring-matter of the formula:

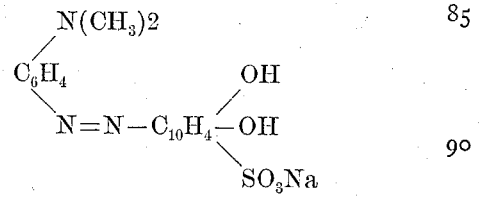

by combining one molecular proportion of the diazo compound of the herein-described dimethyl-paraphenylenediamin with one molecular proportion of the sodium salt of dihydroxynaphthalene sulfo-acid.

2. As new article of manufacture the azo coloring-matter obtainable by the action of one molecular proportion of diazotized dimethyl-paraphenylenediamin upon one molecular proportion of dihydroxynaphthalene sulfonate of sodium, which forms a dark powder with bronze-like luster, almost insoluble in cold water, soluble in alcohol and hot water with a blue color, which color is turned into red when the blue watery solution is mixed with ammonia, sodium-carbonate solution or diluted mineral acids, soluble in concentrated sulfuric acid (66° Baumé) with a violet color which is changed into red on the addition of a large quantity of ice-water, dyeing wool in acid-baths a beautiful blue.

In testimony whereof I have signed my name in the presence of two subscribing witnesses.

FRIEDRICH RÜNKEL.

Witnesses:
OTTO KÖNIG,
L. ROVIG.